(12) United States Patent
Kotter et al.

(10) Patent No.: US 7,013,245 B2
(45) Date of Patent: Mar. 14, 2006

(54) METHOD AND APPARATUS FOR DETECTING CONCEALED WEAPONS

(75) Inventors: Dale K. Kotter, Shelley, ID (US); Frederick D. Fluck, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 101 days.

(21) Appl. No.: 10/778,790

(22) Filed: Feb. 13, 2004

(65) Prior Publication Data

US 2005/0182590 A1 Aug. 18, 2005

(51) Int. Cl.
*G06F 15/00* (2006.01)
(52) U.S. Cl. ...................................... 702/189
(58) Field of Classification Search ................ 702/38, 702/179, 181, 189, 190, 150–153, 94, 95, 702/75–77; 324/207.2; 428/323
See application file for complete search history.

(56) References Cited

U.S. PATENT DOCUMENTS

| | | | |
|---|---|---|---|
| 3,713,156 A | | 1/1973 | Pothier |
| 3,971,983 A | | 7/1976 | Jaquet |
| 5,227,800 A | | 7/1993 | Huguenin et al. |
| 5,334,981 A | | 8/1994 | Smith et al. |
| 5,494,035 A | | 2/1996 | Leuthold et al. |
| 5,552,705 A | | 9/1996 | Keller |
| 5,572,125 A | * | 11/1996 | Dunkel ........................ 324/307 |
| 5,692,446 A | | 12/1997 | Becker et al. |
| 5,694,498 A | | 12/1997 | Manasson et al. |
| 5,694,867 A | | 12/1997 | Diaz-Lopez |
| 5,842,986 A | | 12/1998 | Avrin et al. |
| 6,037,776 A | * | 3/2000 | McGlone ..................... 324/345 |
| 6,359,582 B1 | | 3/2002 | MacAleese et al. |
| 6,418,335 B1 | | 7/2002 | Avrin et al. |
| 6,480,141 B1 | | 11/2002 | Toth et al. |
| 6,496,713 B1 | | 12/2002 | Avrin et al. |
| 2002/0077537 A1 | * | 6/2002 | Avrin et al. ................. 600/409 |
| 2002/0099507 A1 | * | 7/2002 | Clark et al. ................... 702/36 |
| 2003/0161420 A1 | * | 8/2003 | Pupalaikis ................... 375/346 |
| 2004/0147833 A1 | | 4/2004 | Czipott et al. |
| 2004/0147834 A1 | | 7/2004 | Czipott et al. |
| 2004/0169509 A1 | | 9/2004 | Czipott et al. |
| 2004/0189293 A1 | | 9/2004 | Czipott et al. |

OTHER PUBLICATIONS

Kotter, Dale K. et al. "Detection and Classification of Concealed Weapons Using a Magnetometer-based Portel" SPIE Aerosense/Defense Sensing, Simulation, and Controls 16th Annual Conference, Apr. 3, 2002.

* cited by examiner

*Primary Examiner*—Michael Nghiem
*Assistant Examiner*—Cindy D. Khuu
(74) *Attorney, Agent, or Firm*—Dahl & Osterloth, LLC

(57) ABSTRACT

Apparatus for classifying a ferromagnetic object within a sensing area may include a magnetic field sensor that produces magnetic field data. A signal processing system operatively associated with the magnetic field sensor includes a neural network. The neural network compares the magnetic field data with magnetic field data produced by known ferromagnetic objects to make a probabilistic determination as to the classification of the ferromagnetic object within the sensing area. A user interface operatively associated with the signal processing system produces a user-discernable output indicative of the probabilistic determination of the classification of the ferromagnetic object within a sensing area.

19 Claims, 6 Drawing Sheets

METHOD AND APPARATUS FOR DETECTING CONCEALED WEAPONS

CONTRACTUAL ORIGIN OF THE INVENTION

The United States Government has rights in this invention pursuant to Contract No. DE-AC07-99ID13727 between the U.S. Department of Energy and Bechtel BWXT Idaho, LLC.

FIELD OF INVENTION

This invention relates to metal detection apparatus in general and more specifically to methods and apparatus for detecting concealed weapons.

BACKGROUND

Many different kinds of concealed weapons detection systems are known and are used in a wide range of situations in order to provide added security against violent crimes and terrorist attacks. For example, in addition to the well-known uses of concealed weapons detection systems in airports, weapons detection systems are increasingly being used in court houses, schools, and other public and governmental facilities that may be subject to threats or attacks.

One type of concealed weapons detection system utilizes a plurality of magnetic sensors positioned adjacent a sensing area or portal through which pass persons and/or objects (hereinafter referred to as "subjects") to be "scanned" by the weapons detection system. The magnetic sensors of the weapons detection system detect changes or disturbances in an ambient magnetic field (e.g., the earth's magnetic field) caused by a ferromagnetic object (e.g., a weapon) in the sensing area or portal. If a ferromagnetic object of sufficient size is detected, the weapons sensor activates an alarm.

While such magnetic detectors are capable of detecting ferromagnetic objects passing through the detector portal, problems remain in determining whether the detected ferromagnetic object is a threat item (e.g., a gun or a knife) or a non-threat item (e.g., a steel shank of a shoe or a belt buckle). Incorrectly classifying a non-threat item as a threat item results in a false alarm. Of course, incorrectly classifying a threat item as a non-threat item is unacceptable as well.

One type of weapons detection system seeks to distinguish between threat items and non-threat items by analyzing the magnetic "signature" produced by the ferromagnetic object as it passes through the portal. Unfortunately, however, it has proven difficult to reliably distinguish between the magnetic signatures produced by threat items and non-threat items. One difficulty stems from the fact that the magnetic sensors used by such weapons detection systems are highly sensitive to magnetic fields. As a result, the output signals of the sensors often contain magnetic signatures from other sources, such as relatively small ferromagnetic objects (e.g., keys or pocket change) on the subject or relatively large ferromagnetic objects located nearby, but outside, the detector portal. In addition, the detectors may also detect stray magnetic fields produced by various types of electrical equipment.

Other factors affecting the ability to successfully distinguish between threat items and non-threat items relate to the relative position of the ferromagnetic object with respect to the magnetic sensors of the portal. Variations in the speed of passage of the object through the portal can also affect the ability to distinguish between threat items and non-threat items. In addition, the vertical position of the ferromagnetic object with respect to the portal, the magnetic signatures resulting from other ferromagnetic objects that may be on the subject, as well as the particular gait through the portal of a person carrying such ferromagnetic objects, all add to the difficulty in distinguishing threat items from non-threat items.

As a result of these problems, a need remains for a weapons detection system that can more accurately and reliably distinguish between a threat item, such as a gun or a knife, and a non-threat item, such as a belt buckle or a steel shank in a shoe.

SUMMARY OF THE INVENTION

Apparatus for classifying a ferromagnetic object within a sensing area may comprise a magnetic field sensor that produces magnetic field data. A signal processing system operatively associated with the magnetic field sensor comprises a neural network. The neural network compares the magnetic field data produced by the magnetic field sensor with magnetic field data produced by known ferromagnetic objects to make a probabilistic determination as to the classification of the ferromagnetic object within the sensing area. A user interface operatively associated with the signal processing system produces a user-discernable output indicative of the probabilistic determination of the classification of the ferromagnetic object within a sensing area.

Also disclosed is a method for classifying a ferromagnetic object within a sensing area that comprises: Sensing, during a sample time, a magnetic field in the sensing area; producing magnetic field data representative of the sensed magnetic field during the sample time; using a neural network to compare the magnetic field data with magnetic field data produced by known ferromagnetic objects to make a probabilistic determination as to the classification of the ferromagnetic object within the sensing area; and producing a user-discernable output indicative of the probabilistic determination of the classification of the ferromagnetic object within the sensing area.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
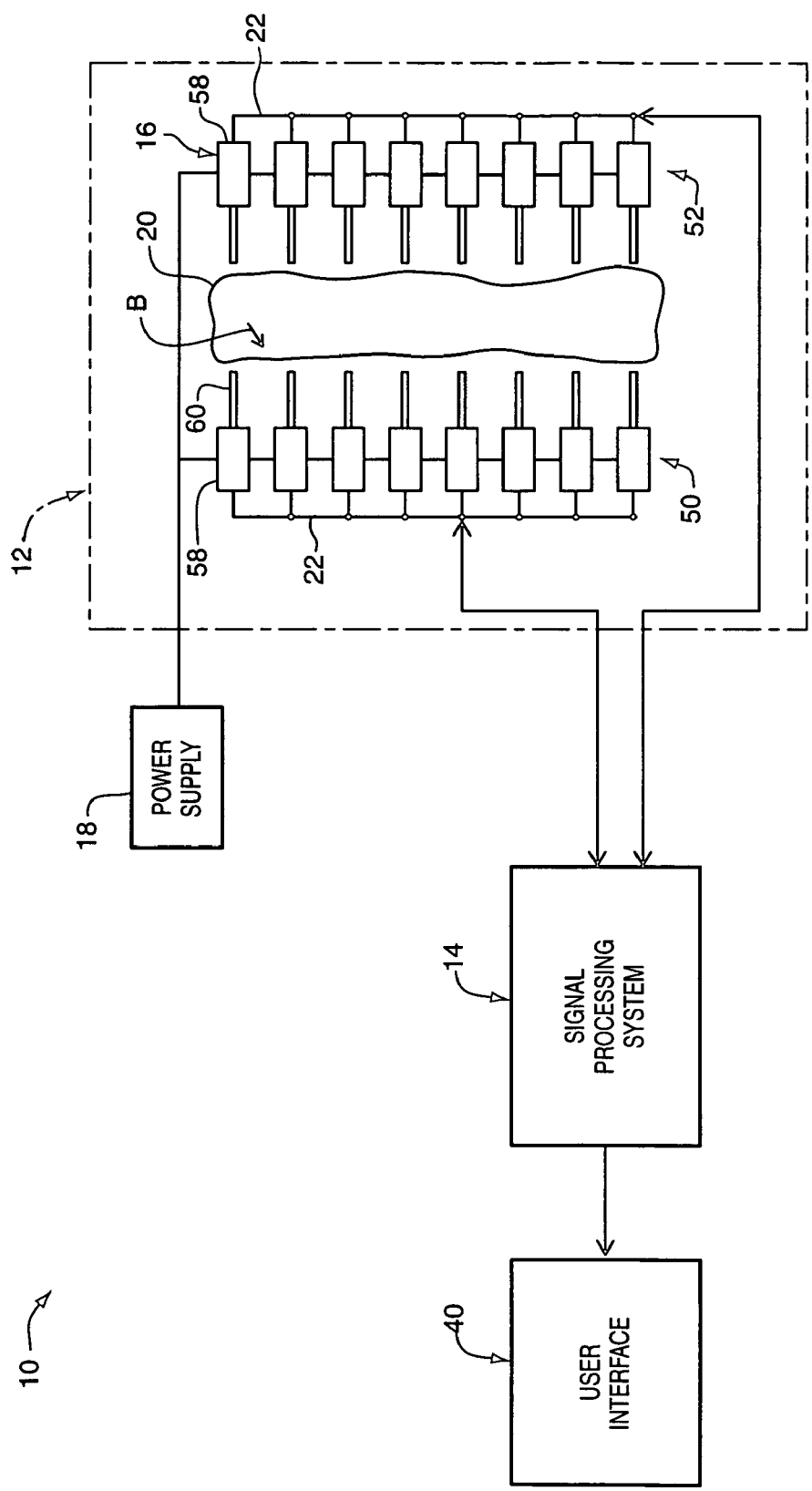
FIG. 1 is a schematic representation of a system for detecting and classifying the presence of a ferromagnetic object according to one embodiment of the present invention.

A system 10 for detecting and classifying the presence of a ferromagnetic object according to one embodiment of the present invention is illustrated in FIG. 1 and may comprise a sensor array 12 connected to a signal processing system 14. The sensor array 12 may comprise a plurality of magnetic sensors or magnetometers 16, each of which is connected to a suitable power supply 18. The sensors or magnetometers 16 sense changes or disturbances in an ambient magnetic field B (e.g., the earth's magnetic field) caused by the presence of a ferromagnetic object or objects (not shown) within a sensing area or portal 20 adjacent the magnetometers 16. Each magnetometer 16 produces an output signal comprising magnetic field data 22 that are related to the detected magnetic field B.

The signal processing system 14 is connected to the sensors 16 comprising the sensor array 12 and includes several different types of processing systems and software modules to analyze and process the output signals from the magnetometers 16 containing the magnetic field data 22. More specifically, and with reference now to FIG. 3, the signal processing system 14 includes a neural network 24. As will be described in greater detail below, the neural network 24 compares the magnetic field data 22 from the magnetometers 16 with a database (not shown) containing magnetic field data produced by known ferromagnetic objects. The neural network 24 then makes a probabilistic determination as to the classification of the ferromagnetic object. An example classification is whether the ferromagnetic object comprises a threat item or a non-threat item. Alternatively, other classifications are possible.

Figure 3:
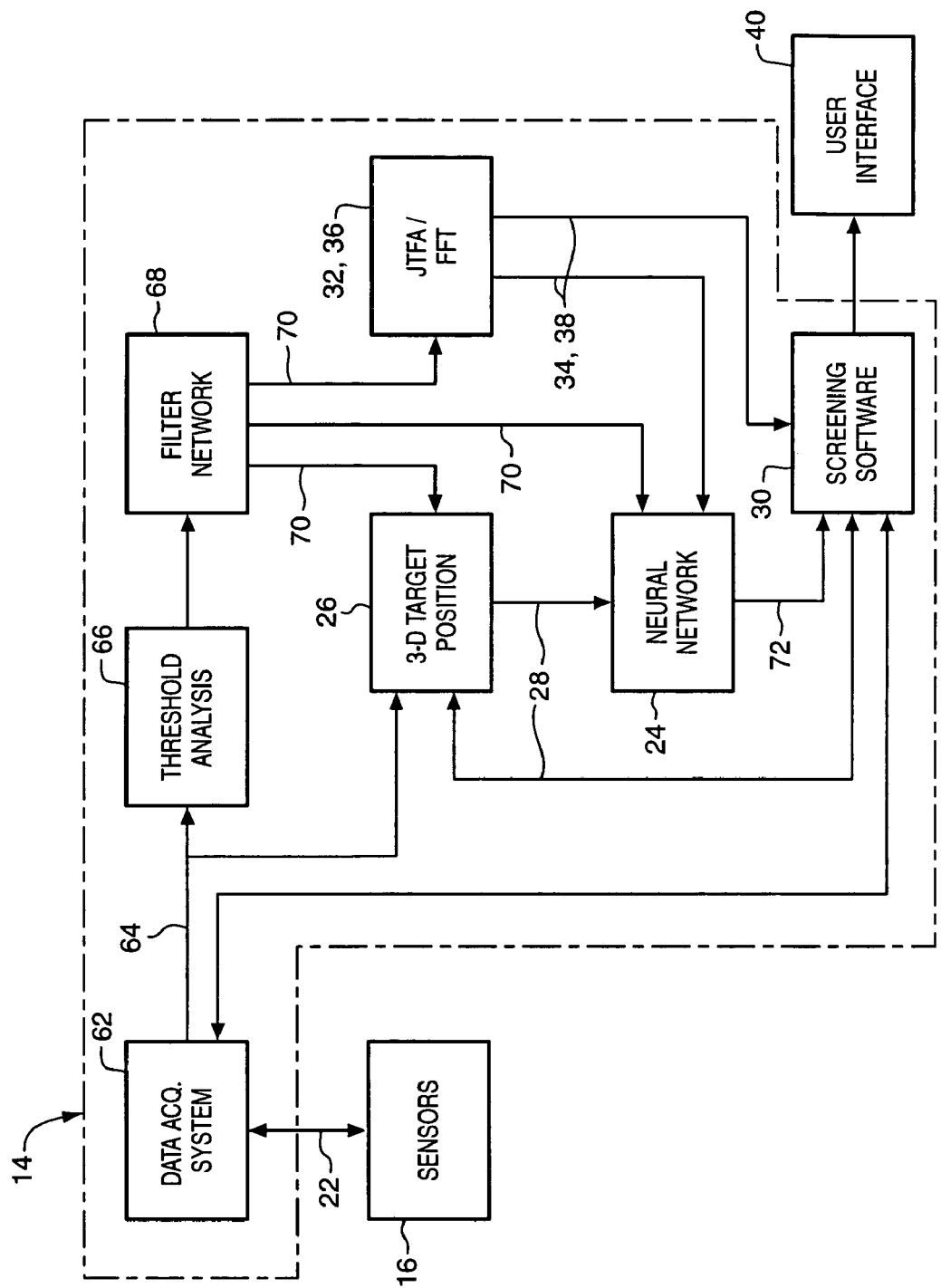
FIG. 3 is a block diagram of the system for detecting and classifying the presence of a ferromagnetic object.

Referring now primarily to FIG. 3, the signal processing system 14 may also comprise a 3-D target position analyzer 26. Briefly, the 3-D target position analyzer 26 processes the magnetic field data 22 and produces an output signal 28 containing data that are indicative of a location of the ferromagnetic object with respect to the subject (e.g., a person or an object). The 3-D target position analyzer 26 is operatively connected to both the neural network 24 and to screening software 30 so that the output signal 28 produced by the 3-D target position analyzer 26 may be subsequently further processed by the neural network 24 and the screening software 30 in the manner that will be more fully described below.

The signal processing system 14 may also comprise a joint time-frequency analysis (JTFA) processor 32. The joint time-frequency analysis (JTFA) processor 32 processes the magnetic field data 22 produced by the magnetometers 16 in the joint time-frequency domain and produces joint time-frequency analyzed (JTFA) data 34. The JTFA processor 32 is operatively connected to both the neural network 24 and to the screening software 30. As will be described in greater detail below, the JTFA data 34 produced by the JTFA processor 32 may be subsequently further processed by the neural network 24 and by the screening software 30.

In the embodiment shown and described herein, the signal processing system 14 further comprises a fast Fourier transform (FFT) processor 36. The fast Fourier transform (FFT) processor 36 analyzes the magnetic field data 22 produced by the magnetometers 16 in the frequency domain and produces frequency domain (FFT) data 38. The fast Fourier transform (FFT) processor 36 is operatively connected to both the neural network 24 and to the screening software 30. Accordingly, the FFT data 38 produced by the FFT processor 36 may be subsequently further processed by the neural network 24 and by the screening software 30 in a manner that will be described in greater detail below.

The system 10 may also comprise a user interface 40 (FIGS. 1 and 3) connected to the signal processing system 14. The user interface 40 may be used to present for a system operator (not shown) a wide range of information about the magnetic field data 22 collected by the sensor array 12. The user interface 40 may also be used to present for the system operator the probabilistic determination of the classification of the ferromagnetic object (e.g., as a threat or a non-threat item). Thereafter, the system operator may take the appropriate action.

Figure 8:
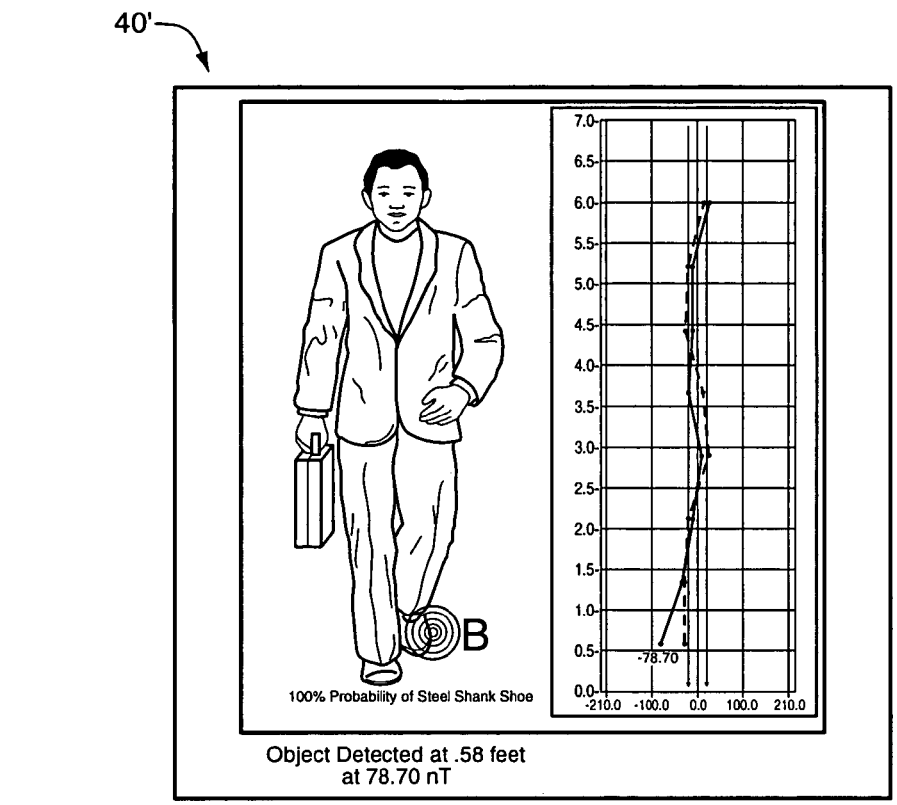
FIG. 8 is a pictorial representation of a first type of user interface that may be presented to a user.

With reference now to FIG. 8, one example of a user interface 40 may comprise a split-screen interface 40'. The left-hand side of split-screen user interface 40' may comprise a snap-shot (e.g., a caricature or a single video frame) of a subject (e.g., a person) passing through the portal 20. The right-hand side of split-screen interface 40' may comprise a plot of magnetic field gradient vs. vertical position. This plot allows a system operator to readily confirm an approximate vertical position (i.e., with respect to the portal 20) of the detected ferromagnetic object. In addition, because the plot of magnetic field gradient vs. vertical position is presented adjacent the snap shot of the subject passing through the portal, the system operator may also readily correlate the vertical position of the detected ferromagnetic object with the subject passing through the portal 20. In one preferred embodiment, the user interface 40' also places a marker (e.g., such as concentric circles "B") on the left-hand portion of the split-screen user interface 40' that correlates to the approximate horizontal and vertical position of the detected ferromagnetic object. Accordingly, the marker (e.g., concentric circles "B") further assists the system operator in specifically identifying the probable location of the detected ferromagnetic object.

The split-screen user-interface 40' may also present the probabilistic determination of the classification (e.g., threat or non-threat item) of the detected ferromagnetic object. The user-interface 40' may also present the probable identity of the object as well, via a suitable text message, such as, for example, the message: "100% Probability of Steel Shank Shoe." If the probabilistic determination is of a threat item, the split-screen user-interface 40' may also present additional information, such as a flashing message or warning beacon stating: "Warning, Threat Item Detected." Of course, the probable identity of the threat item could also be displayed via a suitable text message. The probabilistic determination may also be presented aurally, e.g., via one or more tones or similar audible signals.

Figure 9:
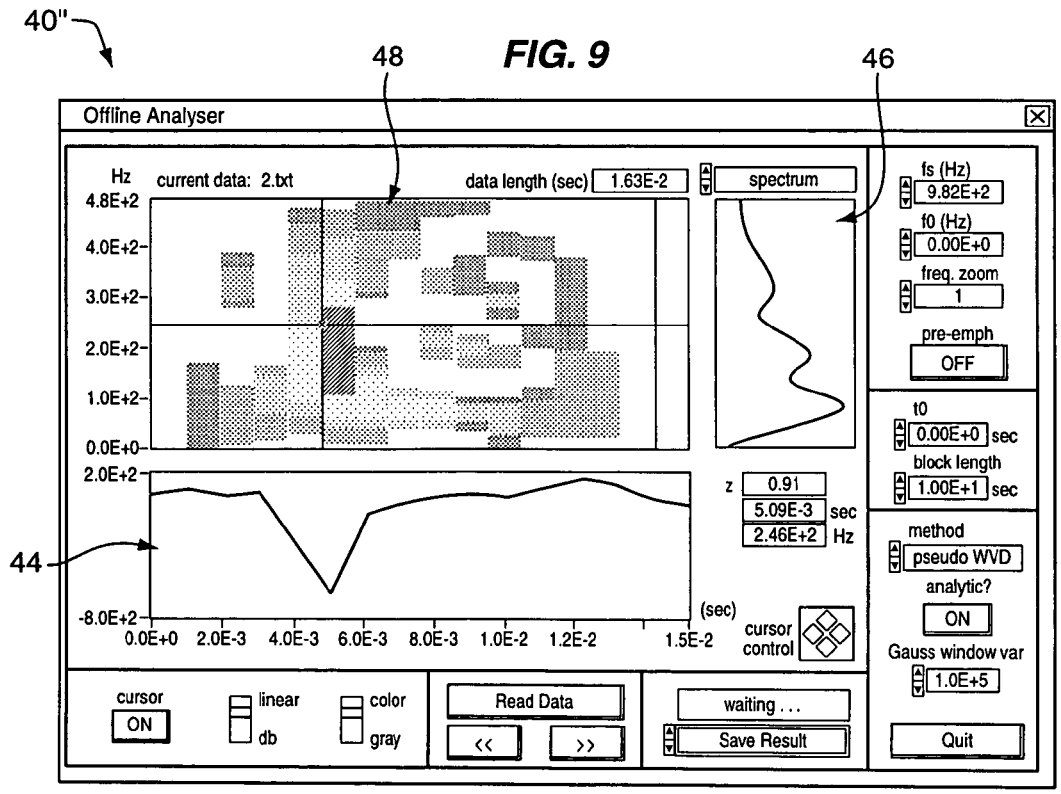
FIG. 9 is a pictorial representation of a second type of user interface that may be presented to a user.

Another type of user interface 40 that may be presented for the user includes a technical user interface 40" illustrated in FIG. 9. The technical user interface 40" presents in various forms information derived from the magnetic field data 22 produced by the magnetometers 16. For example, the technical user interface 40" illustrated in FIG. 9 may comprise a first window 44 that presents the magnetic field data 22 in the time domain. A second window 46 contains a presentation of the magnetic field data 22 in the frequency domain (e.g., a so-called spectrum analysis). A third window 48 presents the magnetic field data 22 in the joint time-frequency domain. As will be described in greater detail below, the technical user interface 40" may be useful in "training" the system 10 itself, as well as the system operator (not shown). The technical user interface 40" may also be useful in assessing the performance of the system 10 over time. Of course, the technical user interface 40" may be useful for other purposes as well.

The system 10 may be utilized as follows to make a probabilistic determination as to the classification (e.g., threat or non-threat item) of a ferromagnetic object within the sensing area or portal 20. After the system 10 has been set-up and initialized, it awaits a signal to begin processing magnetic field data 22 collected by the magnetometers 16. As will be described in greater detail below, the signal to begin processing may be generated in any of a number of ways. For example, the signal to begin processing may be produced by a sensor, such as an infra-red sensor (not shown) that detects the entry of the subject (e.g., a person or object) into the sensing area or portal 20. Alternatively, the system 10 may be operated in a continuous monitoring mode, in which the detection system 10 continuously monitors the sensor array 12.

Regardless of whether the signal to scan is produced by a sensor that detects the entry of the subject into the scanning area 20, or is produced as a result of the operation of the system 10 in the continuous monitoring mode, the signal processing system 14 collects the magnetic field data 22 produced by the magnetometers 16 comprising the sensor array 12. The signal processing system 14 rapidly processes the collected magnetic field data 22 to detect the presence of a ferromagnetic object. If a ferromagnetic object is detected, the system 10 also makes a probabilistic determination as to the classification of the ferromagnetic object. More specifically, the neural network 24 compares the magnetic field data 22 produced by the magnetometers 16 with a database comprising magnetic field data produced by known ferromagnetic objects. If the signature of the detected magnetic field closely matches (i.e., correlates to) the magnetic signature of a known non-threat item, the system 10 may produce a suitable indication on the user interface 40. Such an indication would correspond to a non-alarm condition, in that a threat item was not detected. On the other hand, if the signature of the detected magnetic field closely matches or correlates to the magnetic signature of a known threat item, the system 10 may produce a suitable indication of an alarm condition on the user interface 40.

As will be described in greater detail below, the neural network 24 may base the probabilistic determination on one or more different aspects of the magnetic field data 22. For example, the neural network 24 may make the determination based solely on filtered magnetic field data 70 (e.g., data directly from filter network 68). Alternatively, the neural network 24 may also base the determination on additional aspects of the magnetic field data 22 contained in data from one or more of the other processors comprising the signal processing system 14. For example, the neural network 24 may also utilize the output data 28 from the 3-D target position analyzer 26; the JTFA data 34 from the JTFA processor 32; the FFT data 38 from the FFT processor 36, or various combinations thereof. Generally, speaking, the more data used by the neural network 24, the more accurate and reliable will be the probabilistic determination as to the classification of the ferromagnetic object. However, and as will be discussed in further detail below, certain circumstances may exist in which it is desirable to have the neural network 24 process only limited aspects of the magnetic field data 22.

In the embodiment shown and described herein, the system 10 operates so that any detected ferromagnetic object is classified as a threat item unless it determines with a sufficient degree of certainty that the detected ferromagnetic object is a non-threat item. Put simply, the system 10 presumes that a detected ferromagnetic object of sufficient size is a threat item.

A significant advantage of the system 10 for detecting and classifying the presence of a ferromagnetic object is that it may be used to not only to detect a ferromagnetic object, but also to make a determination as to the probable classification (e.g., as a threat item or a non-threat item) of the detected ferromagnetic object. Consequently, the present invention may be used to advantage as a weapons detection system. That is, by making a probabilistic determination as to the classification of the detected ferromagnetic object, the method and apparatus of the present invention may be implemented to let pass persons having non-threat ferromagnetic objects thereon, yet signal an alarm condition if the ferromagnetic object is determined to be a threat item.

Having briefly described the method and apparatus for detecting and classifying the presence of a ferromagnetic object, as well as some of its more significant features and advantages, various embodiments of the method and apparatus of the invention will now be described in detail.

Figure 2:
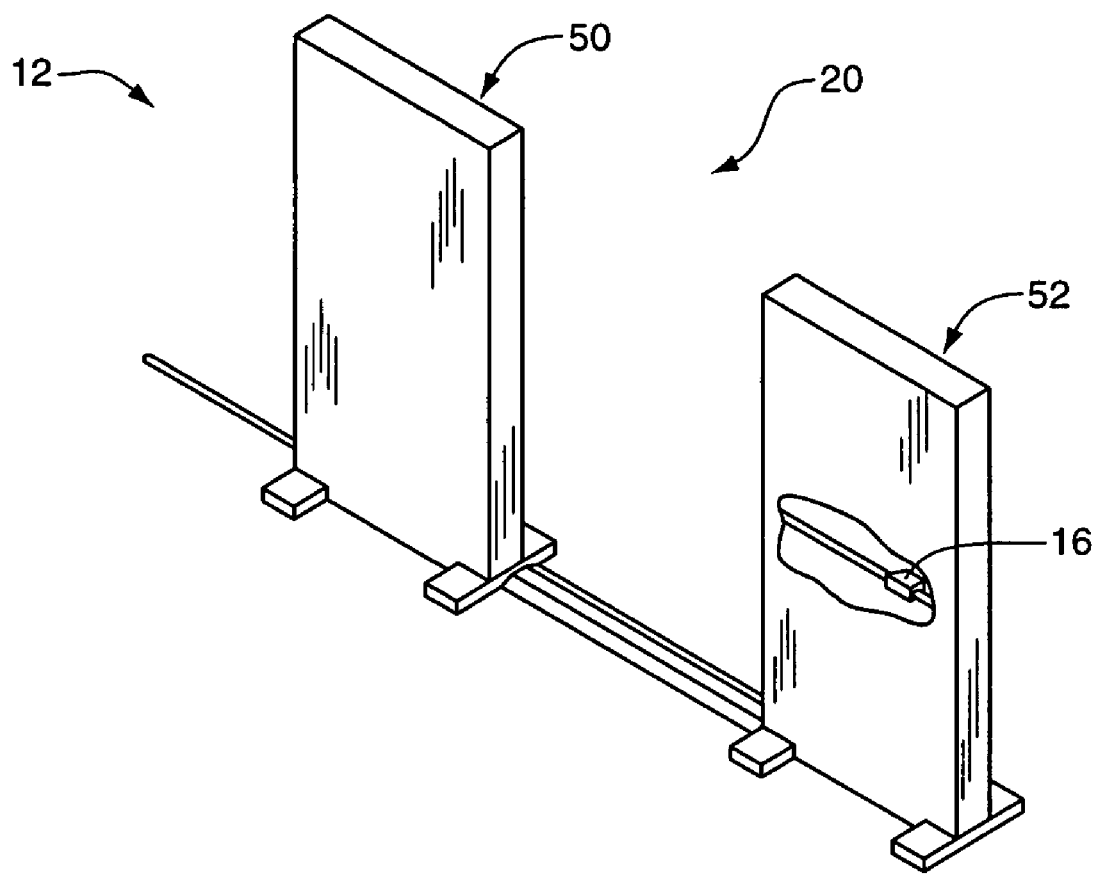
FIG. 2 is a perspective view of a detection portal that may be used to house the magnetic sensors illustrated in FIG. 1.

Referring now to FIGS. 1 and 2 simultaneously, one embodiment of a system 10 for detecting and classifying the presence of a ferromagnetic object comprises a sensor array 12 connected to a signal processing system 14. The sensor array 12 comprises a plurality of magnetic sensors or magnetometers 16, each of which is connected to a suitable power supply 18. As mentioned above, the sensors or magnetometers 16 sense changes or disturbances in an ambient magnetic field B (e.g., the earth's magnetic field) caused by the presence within a sensing area or portal 20 of a ferromagnetic object or objects (not shown). Each magnetometer 16 produces an output signal comprising magnetic field data 22 that are related to the detected changes in the magnetic field B.

The magnetometers 16 that comprise the sensor array 12 may be arranged in any of a wide variety of configurations to define the sensing area or portal 20 suitable for the detection of ferromagnetic objects on the subject (e.g., a person or object). For example, in the embodiment shown and described herein, the sensor array 12 comprises a plurality of magnetometers 16 arranged in two generally vertically oriented rows: A first row 50 and a second row 52. Each magnetometer 16 in each row 50, 52 may be generally evenly-spaced from its neighbor. In addition, the rows 50 and 52 are themselves aligned so that the magnetometers 16 are positioned in generally opposed, spaced-apart relation to one another. In the embodiment shown and described herein, the two rows 50 and 52 of magnetometers 16 are enclosed by two respective panels 54 and 56. See FIG. 2. The area between the panels 54 and 56 defines the sensing area or portal 20.

The magnetometers 16 may comprise any of a wide range of devices capable of detecting magnetic fields, such as, for example, magnetic gradiometers. Briefly, a magnetic gradiometer is a device that is sensitive to changes in the gradient of a magnetic field (e.g., magnetic field B in FIG. 1). As used herein, the term "gradient" defines a vector quantity obtained from the magnetic field, the components of which are the partial derivatives of the magnetic field such that the gradient of the magnetic field is the maximum rate of change of the magnetic field in a given direction. By way of example, in one preferred embodiment, each magnetometer 16 comprises a magneto-resistive type of gradiometer 58 (Rev. F), manufactured by Quantum Magnetics of San Diego, Calif., a subsidiary of InVision Technologies. Alternatively, other brands and/or types of magnetometers may be used.

The gradiometers 58 comprising the magnetometers 16 are generally sensitive to changes in the magnetic field gradient in the direction of orientation of a sensing rod 60 comprising the gradiometer 58. Accordingly, for the case where the gradiometers 58 are mounted so that their respective sensing rods 60 are positioned generally horizontally, the gradiometers 58 are sensitive to variations in the horizontal gradient of the magnetic field B.

While any number of magnetometers 16 may be incorporated into the sensor array 12, in one embodiment, the sensor array 12 comprises eight (8) gradiometers 58 per row 50 and 52, for a total of sixteen (16) gradiometers 58. In the embodiment shown and described herein, the vertical distance separating the sensing rods 60 of the gradiometers 58 is in the range of about 8–10 inches, although other spacings may be used. The horizontal distance between the two rows 50 and 52 is in the range of about 3–4 feet. However, other horizontal distances may also be used.

Referring now primarily to FIG. 3, with occasional reference to FIG. 1, the system 10 also includes a signal processing system 14. In the embodiment shown and described herein, the signal processing system 14 comprises a general purpose programmable computer, such as a personal computer (not shown), that is provided with the necessary hardware and software components to implement the functions provided by the various modules and components described herein. Alternatively, the various modules and components comprising the signal processing system 14 could be otherwise implemented, such as, for example, by application-specific hardware components, as would be obvious to persons having ordinary skill in the art after having become familiar with the teachings of the present invention. Accordingly, the present invention should not be regarded as limited to any particular implementation of the various modules and components of the signal processing system 14.

In the embodiment shown and described herein, the signal processing system 14 is provided with a data acquisition system 62. The data acquisition system 62 interfaces with the various sensors 16 comprising the sensor array 12 and the screening software 30. The data acquisition system 62 collects the output signals containing the magnetic field data 22. The data acquisition system 62 also converts the analog magnetic field data 22 from the magnetometers 16 into digital magnetic field data 64 suitable for subsequent processing by the other components and modules comprising the signal processing system 14. In one preferred embodiment, the data acquisition system 62 comprises a multi-function data acquisition system and operates in accordance with the method described in U.S. Pat. No. 6,150,810, entitled "Method for Detecting the Presence of a Ferromagnetic Object Using Maximum and Minimum Magnetic Field Data," which is incorporated herein by reference for all that it discloses.

Briefly, the method disclosed in U.S. Pat. No. 6,150,810 involves operating the data acquisition system 62 so that it scans all of the magnetometers 16 in the sensor array 12 nearly simultaneously. Accordingly, the scanned magnetic field data 22 basically represent a single snap shot of the magnetic field characteristics (e.g., gradients) sensed by the array 12 at a particular moment in time. Thereafter, the entire array 12 is sampled at a lower frequency to determine changes in the magnetic field over time, e.g., the time during which the subject is passing through the sensing area or portal 20. While many different scanning and sampling rates may be used, in one preferred embodiment, each magnetometer 16 in the sensor array 12 is scanned at a frequency of about 100 kHz. This comparatively high scanning frequency ensures that the time period between the scanning of two magnetometers 16 is very short, in this example about 10 μsec. Therefore, a sensor array 12 containing sixteen magnetometers 16 can be scanned in about 160 μsec. The frequency at which the entire array 12 is sampled is considerably lower, being about 1 kHz. That is, the entire array 12 is sampled about 1000 times per second.

The data acquisition system 62 may comprise any of a wide range of systems well-known in the art for performing the functions described herein. Accordingly, and the present invention should not be regarded as limited to any particular device or system. However, by way of example, in the embodiment shown and described herein wherein the signal processing system 14 comprises a personal computer, the data acquisition system 62 comprises a multi-function 16-bit data acquisition system available from National Instruments of Austin, Tex. as model No. 6033E DAQ, which is specifically designed to interface with personal computer systems. Alternatively, the data acquisition system may comprise a model no. DAS6402/16 DAQ card available from Measurements & Computing of Middleboro, Mass.

The signal processing system 14 may also comprise a threshold analysis processor 66. The threshold analysis processor 66 prevents from being further processed digital magnetic field data 64 having field strengths (e.g., in nanotesla) below a predetermined threshold. Accordingly, magnetic field variations resulting from the presence of small ferromagnetic objects, such as coins, keys, etc., or resulting from the presence of stray and weak magnetic fields, are not further processed. The particular predetermined threshold level (e.g., in nanotesla) that may be selected for use by the threshold analysis processor 66 will vary depending on the application and the desired degree of sensitivity. Consequently, the present invention should not be regarded as limited to any particular predetermined threshold. However, by way of example, in one preferred embodiment, the predetermined threshold level is set to be about 40 nanotesla. That is, the threshold analysis processor 66 prevents from being further processed magnetic field variations having strengths below about 40 nanotesla. Alternatively, in certain applications a lower threshold value, such as 20 nanotesla, may be desirable for increased sensitivity, e.g., to allow the magnetic signatures of small ferromagnetic objects, such as razor blades, to be detected and processed.

The threshold analysis processor 66 may comprise any of a wide range of systems or devices suitable for functioning in the manner described herein. By way of example, in one preferred embodiment, the function of the threshold analysis processor 66 is performed by the general purpose programmable computer (not shown) comprising the signal processing system 14. That is, the computer is provided with suitable software for comparing the magnetic field data 22 to the predetermined threshold and for preventing from being further processed magnetic field data 22 that are below the predetermined threshold. Alternatively, however, the threshold analysis processor 66 could be otherwise implemented, as would be obvious to persons having ordinary skill in the art after having become familiar with the teachings of the present invention. Consequently, the present invention should not be regarded as limited to processors and modules implemented by a general purpose programmable computer.

The signal processing system 14 may also comprise a filter network 68. The filter network 68 filters the magnetic field data 22 from the threshold analysis processor 66 in order to remove unwanted components or aspects from the magnetic field data 22. Examples of unwanted aspects of the magnetic field data include 50 and/or 60 Hz noise components which may be induced by electrical equipment nearby the sensor array 12, as well as other types of periodic components not related to the magnetic signature produced by the ferromagnetic object.

In the embodiment shown and described herein, the filter network 68 filters the magnetic field data 22 in accordance with an inverse Chebyshev filter algorithm. The inverse Chebyshev filter algorithm provides a sharp transition between the passband and the stopband while using a lower-order filter, which results in small absolute errors and higher execution speeds. An inverse Chebyshev filter typically has a smaller transition region than other types of filters (e.g., Hanning and Hamming filters). While Chebyshev filters may have higher ripple than other kinds of filters, the ripple in an inverse Chebyshev filter is primarily in the stopband, as opposed to the passband, thereby allowing an inverse Chebyshev filter to be used to advantage in the present invention.

The inverse Chebyshev filter may be used to advantage in filtering or removing unwanted aspects of the magnetic field data 22 (e.g., 50–60 Hz noise), while retaining the portions or signatures of the magnetic field data 22 that are relevant to the detected ferromagnetic object. However, because inverse Chebyshev filter algorithms are well-known in the art and could be easily implemented by persons having ordinary skill in the art after having become familiar with the teachings of the present invention, the particular details of the inverse Chebyshev filter comprising the filter network 68 will not be described in further detail herein.

The filter network 68 may be implemented by the general purpose programmable computer programmed to function as the signal processing system 14. More specifically, the computer is provided with a software package that contains an inverse Chebyshev filter algorithm. Alternatively, however, the filter network 68 could be otherwise implemented, as would be obvious to persons having ordinary skill in the art after having become familiar with the teachings of the present invention.

As briefly mentioned above, the signal processing system 14 also comprises a neural network 24. The neural network 24 is operatively associated with the filter network 68 and receives filtered magnetic field data 70 therefrom. The neural network 24 is also operatively associated with the 3-D target position analyzer 26, the JTFA 32, and the FFT processor 36, as best seen in FIG. 3.

The neural network 24 assigns weight values to various aspects of the data from the various processors (e.g., filter network 68, 3-D target position analyzer 26, JTFA 32, and FFT processor 36). The neural network 24 compares the weighted data to magnetic field data produced by known ferromagnetic objects in order to make a probabilistic determination as to the classification of the ferromagnetic object within the portal or sensing area 20. The probabilistic determination is embodied in output data 72 produced by the neural network 24.

In the embodiment shown and described herein, the neural network 24 comprises a software program operating on the general purpose programmable computer (not shown) that functions as the signal processing system 14. Alternatively, however, the neural network 24 may be otherwise embodied, as would be obvious to persons having ordinary skill in the art after having become familiar with the teachings of the present invention. Accordingly, the present invention should not be regarded as limited to any particular embodiment of a neural network.

When embodied as a program performed by a general purpose programmable computer, the neural network 24 may comprise any of a wide range of programs now known in the art or that may be developed in the future for implementing the basic functionality of a neural network, i.e., that of using previously solved examples to build a system of "neurons" (e.g., weight factors) to make new decisions and classifications. Neural networks look for patterns in training sets of data, learn those patterns, and develop the ability to correctly classify new patterns or classifications. Stated more simply, neural networks are a form of pattern recognition.

Because neural networks are known in the art and could be easily provided by persons having ordinary skill in the art after having become familiar with the teachings of the present invention, the particular neural network 24 utilized in one embodiment of the invention will not be described in great detail herein. However, a high level description of a neural network follows in order to provide a basis for better understanding the overall function of a neural network 24.

As mentioned, a neural network is a kind of pattern recognition algorithm that operates by finding linear relationships between the inputs and the output. Weight values are assigned to the links between the inputs and output. After these linear relationships are found, "neurons" are added to a hidden layer so that non-linear relationships can be found as well. Input values in the first layer are multiplied by the weights and passed to the second (i.e., hidden layer). Neurons in the hidden layer "fire" or produce outputs that are based upon the sum of the weighted values passed to them. The hidden layer passes values to the output layer in the same fashion. The output layer produces the desired results (i.e., classifications). The network "learns" by adjusting the interconnection weights between layers. The answers the network produces are repeatedly compared with the correct answers, and each time the connecting weights are adjusted slight in the direction of the correct answers. Additional hidden layers (i.e., neurons) may be added as necessary to capture features in the data set.

The neural network 24 utilizes a database (not shown) of magnetic field data from known ferromagnetic objects in making the probabilistic determination. The database may be provided with magnetic field data corresponding to magnetic field data processed in accordance with the various modules and processors shown and described herein. For example, the database may contain time-domain magnetic field data that are used by the neural network 24 in making a probabilistic determination based on the filtered magnetic field data 70 from the filter network 68 or on data 28 from the 3-D target position analyzer 26. The database may also contain joint time-frequency domain magnetic field data from known ferromagnetic objects. The joint time-frequency domain magnetic field data may be used by the neural network in making a probabilistic determination based on JTFA data 34. Similarly, the database may be provided with frequency domain magnetic field data from known ferromagnetic objects that are used by the neural network 24 to make a probabilistic determination based on FFT data 38.

The database of magnetic field data from known ferromagnetic objects may be continually expanded as the neural network 24 "learns." That is, magnetic field data from each new ferromagnetic object sensed by the detector system 10 may be added to the database, thereby allowing the system 10 to become "smarter" over time. That is, the longer the system 10 is in use, the greater the ability of the neural network 24 to make an accurate determination as to the classification of the detected ferromagnetic object. However, because neural networks and the processes by which data can be added to a database utilized by a neural network are known in the art and could be provided by persons having ordinary skill in the art after having become familiar with the teachings of the present invention, these particular aspects of the neural network 24 will not be discussed further herein.

The signal processing system 14 may also be provided with a 3-D target position analyzer 26 that is operatively associated with the data acquisition system 62, the filter network 68, the neural network 24, and the screening software 30. The 3-D target position analyzer 26 receives unfiltered magnetic field data 64 from the data acquisition system 62, filtered magnetic field data 70 from the filter network 68, and produces an output signal that contains data 28 that are indicative of a location of the ferromagnetic object with respect to the subject in the sensing area or portal 20. More specifically, the 3-D target position analyzer 26 identifies the location of the detected ferromagnetic object as being in front of the subject, in back of the subject, or somewhere between.

As will be described in greater detail below, the 3-D target position analyzer 26 utilizes a positional interpretation algorithm 80 (FIG. 4) to analyze the temporal relationship between a detected magnetic signature and an initial trigger produced when the subject enters the sensing area or portal 20. The initial trigger may be generated by an infra-red detector (not shown) which detects the entry of the subject into the sensing area 20. Alternatively, the initial trigger may be generated by other means (e.g., by broken light beams or by pressure sensors) associated with the sensing area or portal 20, as would be obvious to persons having ordinary skill in the art after having become familiar with the teachings of the present invention.

Regardless of the particular device that is used to generate the initial trigger, thus signal the entry of the subject into the sensing area 20, the 3-D target position analyzer 26 interprets a magnetic signature passing in correlation and with little delay from the initial trigger as being in a frontal position. That is, the 3-D target position analyzer 26 regards the detected ferromagnetic object as being in a frontal position with respect to the subject passing through the portal 20. Magnetic signatures having a long delay as compared to the initial trigger event are interpreted as being in a back or rear position. Thus, the ferromagnetic object is regarded by the 3-D target position analyzer 26 as being in a rear or back position with respect to the subject. If the magnetic signature has a delay somewhere between the short and long delays, the ferromagnetic object is interpreted as being in mid-position with respect to the subject. Accordingly, the output signal 28 from the 3-D target position analyzer 26 includes data relating to whether the detected ferromagnetic object is regarded as being in a frontal position, a mid-position, or a rear position with respect to the subject being scanned.

In the embodiment shown and described herein, the 3-D target position analyzer 26 utilizes position data from the screening software 30 in order to reduce the amount of processing required to produce the position data 28. That is, in order to avoid processing all of the data produced by each sensor 16, the 3-D target position analyzer 26 utilizes the horizontal and vertical position values obtained from the screening software 30 in order to determine those sensor(s) 16 that produced the strongest response to the ferromagnetic object. The 3-D target position analyzer 26 then processes the unfiltered data 64 from the data acquisition system 62 from only those sensor(s) that produced the strongest response.

The signal processing system 14 may also be provided with a joint time-frequency analysis (JTFA) processor 32. In the embodiment shown and described herein, the JTFA processor 32 is operatively associated with the filter network 68 and receives filtered magnetic field data 70 therefrom. The JTFA processor 32 is also operatively associated with the neural network 24 and the screening software 30, so that the neural network 24 and screening software 30 receive JTFA data 34 from the JTFA processor 32.

The joint time-frequency analysis (JTFA) processor 32 processes the filtered magnetic field data 70 in the joint time-frequency domain to produce joint time-frequency (JTFA) data 34. Joint time-frequency data analysis is useful in assessing non-periodic or transient signals (i.e., so-called "chirp" signals). A presentation of magnetic field data 22 in the joint time-frequency domain is illustrated in window 48 of FIG. 9. More specifically, in FIG. 9, the JTFA data 34 are presented with the ordinate (i.e., the vertical axis) being frequency and the abscissa (i.e., the horizontal axis) being time. The details of the JTFA data 34 and how the data are processed by the neural network 24 will be discussed in greater detail below.

In the embodiment shown and described herein, the JTFA processor 32 is embodied as a software program or module running on the general purpose programmable computer (not shown) that is programmed to operate as the signal processing system 14. However, because software programs for performing joint time-frequency analysis are known in the art and are readily commercially available, the particular JTFA processor 32 and software for performing the functions of the processor will not be described in further detail herein. Alternatively, however, the JTFA processor 32 may be otherwise implemented, as would be obvious to persons having ordinary skill in the art after having become familiar with the teachings of the present invention. Consequently, the present invention should not be regarded as limited to any particular implementation of a JTFA processor.

The signal processing system 14 may also be provided with a fast Fourier transform (FFT) processor 36. The FFT processor 36 is operatively associated with the filter network 68 and receives filtered magnetic field data 70 therefrom. The FFT processor 36 is also operatively associated with the neural network 24 and the screening software 30, so that the neural network 24 and screening software 30 receive FFT data 38 from the FFT processor 36.

The fast Fourier transform (FFT) processor 36 processes the filtered magnetic field data 70 in the frequency domain to produce frequency domain (FFT) data 38. Such frequency domain data is also often referred to as power spectrum data. A presentation of magnetic field data 22 in the frequency domain is illustrated in window 46 of FIG. 9. More specifically, in FIG. 9, the FFT data 38 are presented with the ordinate (i.e., the vertical axis) being frequency and the abscissa (i.e., the horizontal axis) being normalized intensity. Stated simply, the power spectrum illustrated in window 46 of FIG. 9 conveniently illustrates the predominant frequencies contained in the magnetic field data 22. Additional details regarding the FFT data 38 and how the FFT data 38 are processed by the neural network 24 will be described below.

The FFT processor 36 may be embodied as a software program or module running on the general purpose programmable computer (not shown) that is programmed to operate as the signal processing system 14. However, because software programs for performing frequency analysis (e.g., Fourier transform analysis) are known in the art and are readily commercially available, the particular FFT processor 36 and software for performing the functions of the processor will not be described in further detail herein. Alternatively, however, the FFT processor 36 may be otherwise implemented, as would be obvious to persons having ordinary skill in the art after having become familiar with the teachings of the present invention. Consequently, the present invention should not be regarded as limited to any particular implementation of an FFT processor.

The signal processing system 14 also comprises screening software 30. The screening software 30 receives the various output signals 28, 34, 38, and 72 and processes the various output signals and presents them in a form suitable for the user interface 40. The screening software 30 may also be provided with various modules and/or routines for otherwise processing and/or storing the data, as described below. The screening software 30 also determines the approximate horizontal and vertical position of the detected ferromagnetic object in accordance with the processes described below.

Figure 4:
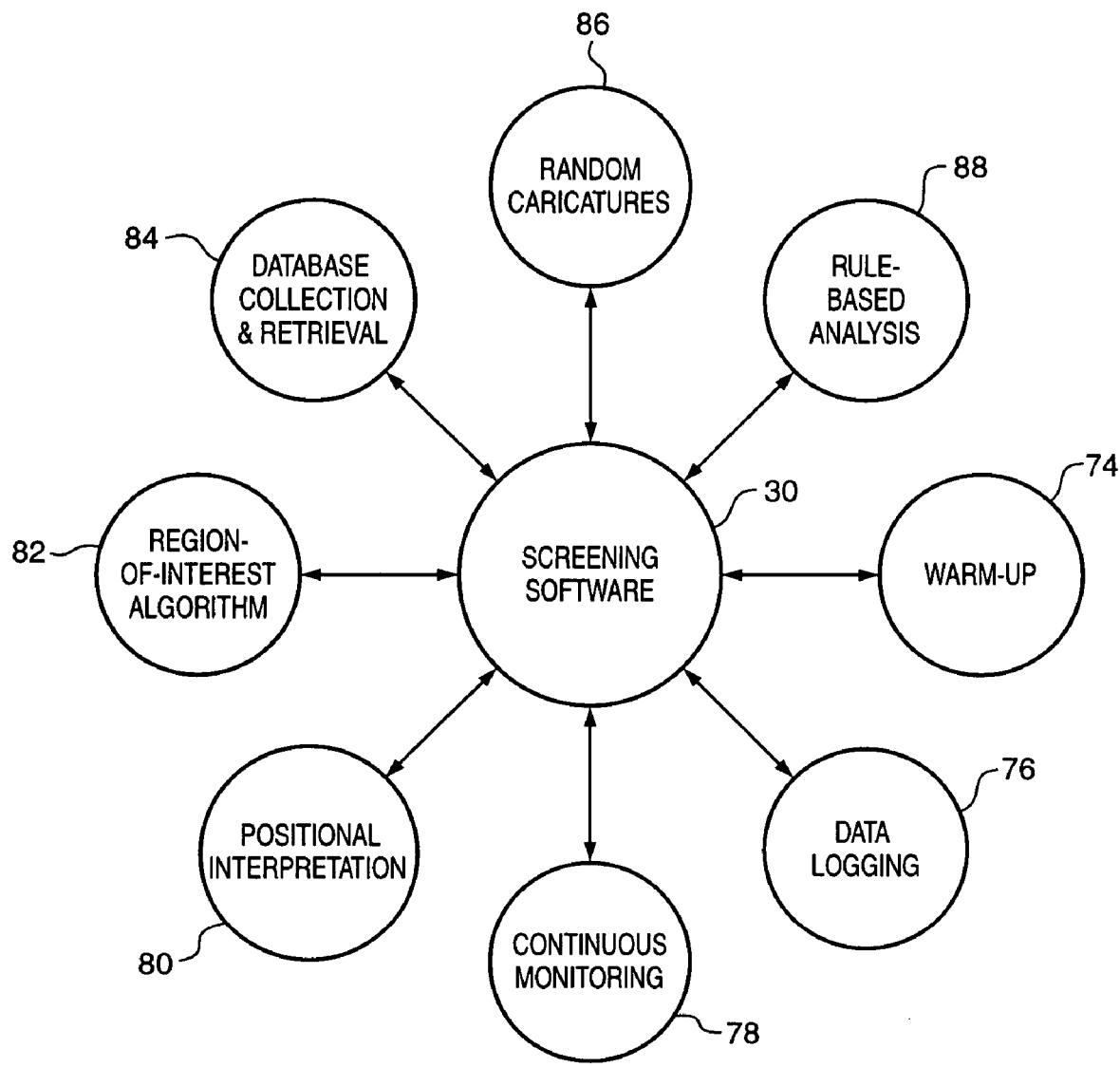
FIG. 4 is a schematic representation of processing modules accessible by the scanning software.

With reference now to FIG. 4, the screening software 30 may comprise a warm-up routine 74. The warm-up routine 74 performs certain testing diagnostics on the system 10 and also allows the system 10 to be stabilized or "warmed-up" prior to use. For example, it is generally preferred, but not required, to allow some period of time to elapse between start-up or initialization of the detector system 10 and actual use of the detector system 10. This is particularly true if the detector system 10 has been moved or relocated since its last period of operation in that the characteristics of the ambient magnetic field B doubtless will be different in different locations.

In the embodiment shown and described herein, we have found it preferable to allow a time of about 6 minutes to elapse between system start-up and use. During this time, the warm-up routine 74 is executed to ensure that the detector system 10 is functioning properly. The warm-up routine 74 is programmed to utilize a 55% time delay period (e.g., 3.5 minutes) for system warm-up. Thereafter, the warm-up routine 74 will cause the signal processing system 14 to automatically poll the sensor array 12, i.e., gather magnetic field data 22 from the various magnetometers 16 comprising the sensor array 12. The magnetic field data 22 collected from the sensor array 12 during the poll are then compared with a predetermined threshold. If the comparison reveals that the magnetic field data 22 exceed the predetermined threshold, the warm-up routine 74 will continue to poll the sensor array 12 every thirty (30) seconds. The warm-up routine 74 continues to compare the magnetic field data 22 collected during the poll with the predetermined threshold until the magnetic field data 22 are equal to or below the predetermined threshold. If the polled magnetic field data 22 are not below the predetermined threshold by the end of the warm-up period (e.g., 6 minutes), the warm-up routine 74 will so advise the system operator (not shown) via the user interface 40. Thereafter, the warm-up routine 42 will allow normal operation of the detector system 10.

The predetermined threshold value used to determine whether the system is warmed-up are saved standard deviation values of the magnetic field data plus a margin. The standard deviation values are calculated from the sequence of values (e.g., in one data acquisition cycle) of the magnetic field data, per channel, which are taken when the system 10 is in the steady state or stabilized condition of more than one hour. The standard deviation values usually will be different for each system due to manufacturing tolerances, component tolerances, etc.

When the system 10 is first powered up, the sensors 16 (FIG. 1) exhibit a baseline voltage float until their internal digital signal processors (not shown) complete an initialization cycle (e.g., ten minutes in one embodiment). As time passes during the initialization cycle, the internal digital signal processor of each sensor 16 adjusts the baseline output of the sensor 16 to zero. This zeroing process allows each sensor 16 to adjust to its surroundings and to compensate for background noise and natural magnetic fluctuations at the particular location.

The standard deviation values are based on a warmed-up system 10 (e.g., typically energized for an hour or more) with no movement of ferromagnetic objects through the portal 20, via the data acquisition system 62. To these standard deviation values, a margin is added. The purpose of the margin is to help to compensate for small fluctuations of the earth's magnetic field and for noise in the vicinity of the system 10. By way of example, in one preferred embodiment, the margin is 400 microvolts. That is, a margin of 400 microvolts is added to the standard deviation values to produce the predetermined threshold, which is then saved.

The screening software 30 may also be provided with a data logging routine 76. The data logging routine 76 records all movements and program settings during normal operation of the detector system 10. By way of example, the data logging routine 76 records into a standard ASCII text data file, with an included time stamp, the foregoing events: All movements and operations through the screening software 30 of the system operator during use; the threshold settings for sensor array sensitivity; any triggered sensor array signal processing system event, whether triggered from an infrared sensor (not shown) for from a continuous scan event; the time at which a system operator logs into or out of the screening software 30; as well as any initialization periods, including any system shutdown or re-start. The data logging routine 76 may save the log file in a suitable archival database for future reference.

The screening software 30 may also be provided with a continuous monitoring routine 78. When the system 10 is operated in the continuous monitoring mode, the signal processing system 14 continuously polls or monitors the sensor array 12 without the need to first receive a trigger event (e.g., such as would indicate the entrance of the subject into the sensing area or portal 20). Accordingly, when operated in the continuous monitoring mode, the system 10 can detect a ferromagnetic object that may be tossed through the sensing area or portal 20 without being associated with a subject. In this mode of operation, the signal processing system 14 continuously processes the magnetic field data 22. If a magnetic signature is detected that is indicative of a threat item, the system 10 will automatically alert the system operator.

Another software module that may be provided to the screening software 30 is a positional interpretation algorithm 80. As was described above, the positional interpretation algorithm 80 is utilized by the 3-D target position analyzer 26 to make a determination as to whether the detected ferromagnetic object is located in front of, behind, or at a mid-position location of the subject. The positional interpretation algorithm 80 compares the position in time of the magnetic signature with the initial trigger. More specifically, the positional interpretation algorithm 80 interprets a magnetic signature passing with little delay from the initial trigger as being in a frontal position. That is, the positional interpretation algorithm 80 regards the detected ferromagnetic object as being in a frontal position with respect to the subject. Magnetic signatures having a long delay as compared to the initial trigger event are interpreted as being in a back or rear position. Thus, the ferromagnetic object is regarded by the positional interpretation algorithm 80 as being in a rear or back position with respect to the subject. If the magnetic signature has a delay somewhere between the short and long delays, then the ferromagnetic object is interpreted as being in mid-position with respect to the subject.

As mentioned above, the positional interpretation algorithm 80 utilizes the horizontal and vertical position data obtained from the screening software 30 in order to reduce the amount of data that must be processed in order to determine whether the ferromagnetic object is located in a frontal position, a back or rear position, or a mid-position. For example, if the horizontal and vertical position data from the screening software 30 indicate that the approximate position of the detected ferromagnetic object is in the upper left portion of the portal 20, the positional interpretation algorithm 80 will limit processing to those unfiltered data 64 produced by the sensor or sensors 16 closest to the detected position, e.g., the sensor or sensors 16 located on the upper left portion of the portal 20.

A region-of-interest module 82 may also be provided to the screening software 30. The region-of-interest module 82 operates in conjunction with an external imaging device, such as a digital camera (not shown) that may be focused on the portal 20 to monitor the passage of subjects (e.g., persons or objects) through the portal 20. The region-of-interest module 82 allows the system operator to adjust certain parameters of the image captured by the external image device so that the image may be more conveniently presented on the user interface 40. For example, in the case wherein the user interface 40 comprises a split-screen user interface 40' of the type illustrated in FIG. 8, the region-of-interest module 82 allows the system operator to center the acquired image in the allocated display area (e.g., the left-hand side of the split-screen user interface). The region-of-interest module 82 may also allow the system operator to crop or otherwise eliminate unwanted or unnecessary image details.

The screening software 30 may also be provided with a database collection and retrieval module 84. This module 84 is used to collect and retrieve both the signal processing system data as well as the acquired image files from the external imaging device. The information from the signal processing system 14 is embedded into the acquired image file so as to keep the data inseparable for file transfer purposes. The database collection and retrieval module 84 may also be provided with an historical or archival viewer for use by the system operator to recall past signal processing system data and image data for analysis or training purposes.

The screening software 30 may also be provided with a random caricatures module 86 which substitutes caricatures for the actual images (e.g., of persons passing through the portal 20) obtained by the external imaging device. In one embodiment, the random caricatures module 86 is used to present a randomly selected caricature on the user interface 40 (e.g., the split screen user interface 40' of FIG. 8) instead of the image acquired by the external imaging device.

The screening software 30 is also provided with a rule-based analysis routine 88 which operates in conjunction with the neural network 24 to allow the neural network to be "trained." By way of example, in one training mode, ferromagnetic non-threat items are passed through the sensing area or portal 20 of the detector system 10. The acquired magnetic field data 22 from the signal processing system 14 are then recorded via a learning algorithm routine in the rule-based analysis routine 88. These data form a database of magnetic signatures of known ferromagnetic objects. This database is subsequently used by the neural network 24 to make the probabilistic determination of the classification of an unknown ferromagnetic object. In another training mode, ferromagnetic threat items are passed through the sensing area or portal 20 of the detector system 10. The magnetic field data 22 from these known threat items are also recorded and added to the database of magnetic signatures of known ferromagnetic objects.

The various modules and/or routines (e.g., 74, 76, 78, 80, 82, 84, 86, and 88) comprising the screening software 30 may be implemented in accordance with any of a wide variety of known software techniques that would result in a software program or module capable of performing the functions and operations of the various modules and/or routines. In addition, the various modules and/or routines comprising the screening software 30 may be written in any of a number of computer languages (e.g., "C" or "C++") that are known in the art or that may be developed in the future. Because the various modules and/or routines comprising the screening software 30 could be easily provided by persons having ordinary skill in the art after having become familiar with the teachings of the present invention, the various modules and/or routines comprising the screening software 30 will not be described in further detail herein.

The detector system 10 may be operated to detect and make a probabilistic determination as to the classification (e.g., as a threat or a non-threat item) of a detected ferromagnetic object. However, before proceeding with a description of the operation of the detector system 10, it is instructive to first discuss certain attributes of magnetic field data 22 that may be produced by ferromagnetic objects passing through the sensing area or portal 20.

Figure 5:
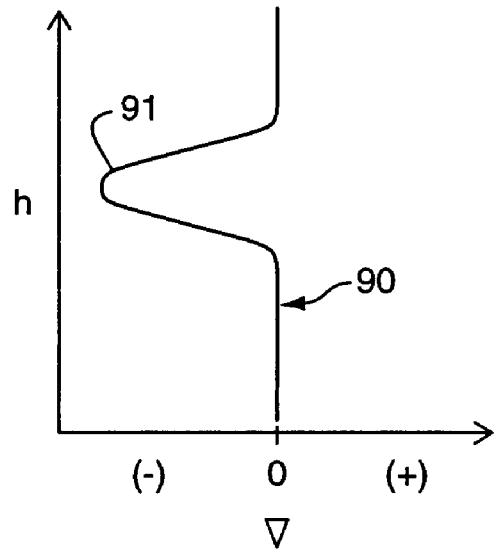
FIG. 5 is a graphical representation of magnetic field gradient vs. vertical position for an object having a monopole response characteristic.
Figure 6:
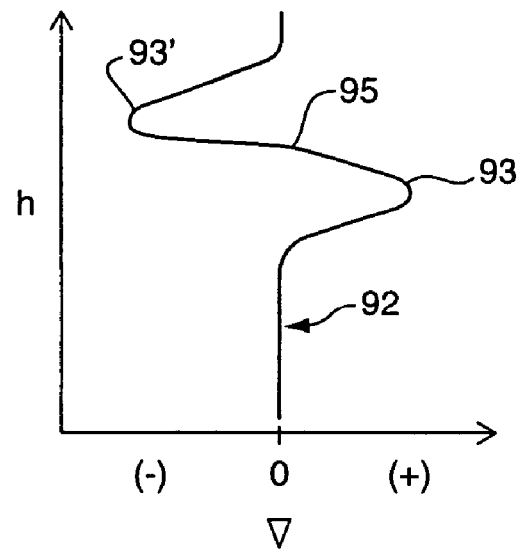
FIG. 6 is a graphical representation of magnetic field gradient vs. vertical position for an object having a dipole response characteristic.
Figure 7:
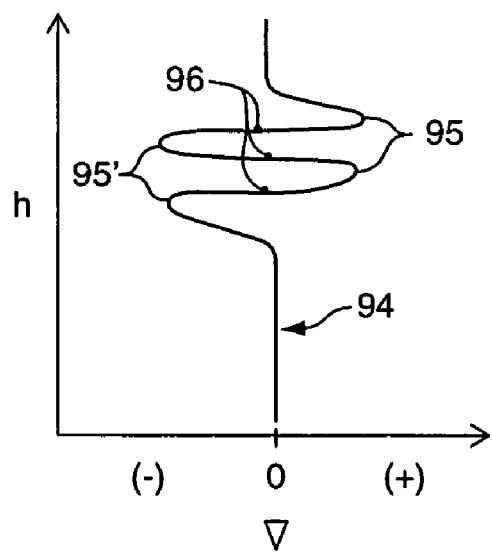
FIG. 7 is a graphical representation of magnetic field gradient vs. vertical position for an object having a quadrupole response characteristic.

With reference now to FIGS. 5–7 a ferromagnetic object passing through the sensing area or portal 20 may produce responses that may be characterized as a monopole response 90 (FIG. 5); a dipole response 92 (FIG. 6); or a quadrupole or complex magnetic moment response 94 (FIG. 7). Alternatively, other types of responses are possible, but these are the most common responses. Generally speaking, a monopole response 90 is produced by a comparatively compact ferromagnetic object (e.g., a compact pistol or handgun, such as a Walther PPK 9 mm semiautomatic pistol). A dipole response 92 is typically produced by a less compact or a comparatively long, slender ferromagnetic object (e.g., a larger, more elongated pistol, such as a Browning 9 mm semiautomatic pistol). A quadrupole or complex magnetic moment response 94 is often produced by multiple ferromagnetic objects or by a large or long ferromagnetic object that produces response from multiple sensors 16.

With reference now to FIG. 5, a monopole response 90 is generally characterized as a response wherein the magnetic gradient $\nabla$ generally does not change sign. For example, the magnetic gradient $\nabla$ illustrated in FIG. 5 generally remains negative. However, the magnetic gradient could also be positive. Stated another way, a monopole response 90 is generally characterized by having a single, predominant peak, such as peak 91. The approximate vertical and horizontal position within the sensing area of a ferromagnetic object producing a monopole response (e.g., monopole response 90), may be determined by the screening software 30 in accordance with the methods disclosed in U.S. Pat. No.

6,150,810, which is incorporated herein by reference for all that it discloses. Accordingly, the particular method utilized by the present invention to determine the approximate horizontal and vertical location of the detected ferromagnetic object will not be discussed in further detail herein.

A dipole response 92 is illustrated in FIG. 6. One significant feature of a dipole response curve 92 is that the magnetic gradient $\nabla$ changes sign (i.e., from a negative gradient or value to a positive gradient or value, or vice versa). Put in other words, a dipole response curve may include one or two relative maximum and/or minimum points (e.g., 93 and 93') as well as an inflection point 95. Stated more simply, a dipole response 92 has one "peak" (e.g., 93) and one "valley" (e.g., 93'). The approximate horizontal and vertical position within the sensing area or portal 20 of a ferromagnetic object producing a dipole response 92 may be determined by the screening software 30 in accordance with the methods disclosed in U.S. Pat. No. 6,150,810, thus will not be discussed in further detail herein.

A quadrupole or complex magnetic moment response 94 is illustrated in FIG. 7. One significant feature of a quadrupole response 94 is that the magnetic gradient $\nabla$ changes sign at least twice. The quadrupole response curve 94 also contains two peaks 95 and two valleys 95' separated by three inflection points 96. The approximate horizontal position within the sensing area or portal 20 of a ferromagnetic object producing a quadrupole response may be determined by the screening software 30 in accordance with the methods disclosed in U.S. Pat. No. 6,150,810 for deriving the horizontal position of a monopole response. The approximate vertical position within the sensing area or portal 20 of a ferromagnetic object producing a quadrupole response may be determined by the screening software 30 in accordance with the methods disclosed in U.S. Pat. No. 6,150,810 for deriving the vertical position of the dipole response.

The detector system 10 may be utilized as follows to make a probabilistic determination as to the classification (e.g., threat or non-threat item) of a ferromagnetic object within the sensing area or portal 20. After the system 10 has been set-up and initialized, it awaits a signal to begin processing magnetic field data 22 collected by the magnetometers 16 comprising the sensor array 12. In one mode of operation, the signal to begin processing is produced by a sensor, such as an infra-red sensor (not shown), that detects the entry of the subject (e.g., a person or object) into the sensing area or portal 20. Alternatively, if the system 10 is operated in the continuous monitoring mode, it will continuously monitor the sensor array 12. Operation the continuous monitoring mode allows the detector to detect a ferromagnetic object that may pass through the portal without the aid of a subject, such as would occur if the object is tossed through the portal 20.

Regardless of whether the signal to scan is produced by a sensor that detects the entry of the subject into the scanning area 20, or is produced as a result of the operation of the system 10 in the continuous monitoring mode, the signal processing system 14 collects the magnetic field data 22 produced by the magnetometers 16. The data 22 are then processed by the threshold analysis processor 66. As discussed above, the threshold analysis processor 66 prevents from being further processed magnetic field data 22 that are below a predetermined threshold. In use, then, a subject passing through the sensing area or portal 20 containing no (or only small amounts) of ferromagnetic material will be regarded as containing no ferromagnetic objects (e.g., either of the threat or non-threat variety). A suitable indication of this condition may be presented by the signal processing system 14 on the user interface 40. Alternatively, no indication need be provided; and the subject simply allowed to continue.

If, on the other hand, the magnetic field data 22 are found by the threshold analysis processor 66 to be above the predetermined threshold, the data will be further sent to the filter network 68. The filter network 68 filters the data in accordance with the inverse Chebyshev filter algorithm. The resulting filtered magnetic field data 70 are then available for the various other processors of the signal processing system 14.

For example, the neural network 24 may receive and process filtered magnetic field data 70 from the filter network 68. The neural network 24 would then compare the filtered magnetic field data 70 with corresponding magnetic field data from the database of known ferromagnetic objects. Thereafter, the neural network 24 produces output data 72 comprising a probabilistic determination of the classification (e.g., a threat item or a non-threat item) of the detected ferromagnetic object. For example, the neural network 24 may determine that the magnetic field data 22 from the ferromagnetic object in the sensing area closely matches an entry in the database corresponding to a non-threat item. If the correlation is sufficiently strong, the output data 72 from the neural network 24 will be indicative of a non-threat item. If, on the other hand, the correlation is not sufficiently strong, the neural network 24 will determine the item to be a threat item. The output data 72 from the neural network 24 is then sent to the screening software 30, and thereafter may be presented on the user interface 40.

The neural network 24 may make the probabilistic determination based on the nature of the detected magnetic field gradient. For example, one characteristic of the magnetic field gradient is whether the response comprises a monopole response 90 (FIG. 5), a dipole response 92 (FIG. 6) or a quadrupole response 94 (FIG. 7). As mentioned above, small, relatively compact items may produce a monopole response 90, while somewhat larger, mor elongated objects may produce a dipole response 92. Still other objects may produce a quadrupole response 94.

The neural network 24 may also receive data relating to the approximate horizontal and vertical positions of the detected ferromagnetic objects, as already described. In addition, other aspects of the responses (e.g., monopole, dipole, or quadrupole) are utilized by the neural network 24 in making the probabilistic determination. For example, the peak amplitude, peak width, peak rise time and peak fall time are calculated and fed into the neural network 24. The peaks of the magnetic gradient decrease significantly with increasing distance from the sensor (i.e., generally inversely as the square of the distance from a sensor). The width of the response widens with increasing distance from the magnetometers 16. The amplitude of the peak or peaks is related to the mass of the ferromagnetic object, with more massive objects resulting in larger peak amplitudes.

In the embodiment shown and described herein, the neural network 24 is configured to process only the filtered magnetic field data 70 from the filter network 68 when the system 10 is operated in the continuous monitoring mode. So limiting the amount of processing avoids processing delays associated with the operation of the various other processors (e.g., the 3-D target position analyzer 26, the JTFA processor 32 and the FF1 processor 36) comprising the signal processing system 14. Accordingly, the system 10 will be more effective in detecting a ferromagnetic object that may be tossed through the sensing area 20. Of course, high-speed data processors may eventually make it unnecessary to so limit the amount of data being processed even in the continuous monitoring mode.

The neural network 24 may also receive additionally-processed magnetic field data and may use such additionally-processed data in making the probabilistic determination of the classification of the ferromagnetic object. For example, the neural network 24 may also be operatively associated with the 3-D target position analyzer 26. As discussed, the output signal of the 3-D target position analyzer 26 includes data 28 relating to the relative position (e.g., front, rear, or mid-position) of the detected ferromagnetic object with respect to the subject. The neural network 24 may utilize this 3-D or time-position data 28 in making the probabilistic determination. For example, if the time position data place the detected object near the front of the subject, and if the signature of the magnetic field data 22 correspond closely to the signature of a belt-buckle, the neural network 24 may determine that the detected ferromagnetic object is likely to be a belt buckle.

In this regard it should be noted that in one embodiment the signal processing system 14 divides the sensing area or portal 20 into zones or regions of interest, such as, for example, feet, legs, waist, midbody, and head. The database of magnetic field data from known ferromagnetic objects is likewise divided into corresponding zones. This division of the sensing area and historical database into zones or regions of interest reduces the processing time and number of potential solutions the neural network must analyze. For example, if the approximate vertical position of the detected ferromagnetic object is determined to be at about a waist position, then the neural network 24 would then compare the magnetic field data 22 to magnetic field data in the database of known ferromagnetic objects (e.g., belt buckles, guns, etc.) commonly carried in the waist position.

The neural network 24 may also be operatively connected to the JTFA processor 32 and receive JTFA data 34 therefrom. As discussed above, JTFA data 34 comprises magnetic field data 22 processed in the joint time-frequency domain. An example of JTFA data 34 is presented in window 48 of technical user interface 40" illustrated in FIG. 9. JTFA data 34 contains information about the way the frequency of the signal varies with time, i.e., the instantaneous power spectrum, as well as the specific frequencies of the major peak. These data are fed to the neural network 24 and may be used by the neural network 24 to make the probabilistic determination of the classification of the ferromagnetic object.

The neural network 24 may also be connected to the FFT processor 36 and receive FFT data 38 therefrom. FFT data 38 comprise magnetic field data 22 processed in the frequency domain (e.g., power spectrum data). An example of FFT data 38 is presented in window 46 of technical user interface 40" illustrated in FIG. 9. The FFT data 38 contain information relating to the average frequency content of the magnetic field data 22 over the entire time the magnetic field data 22 were acquired. The power spectrum of the magnetic field data 22 is calculated by squaring the magnitude of the Fourier transform of the magnetic field data 22. Both data are fed into the neural network 24.

The probabilistic determination as to the classification of the ferromagnetic object may be presented on the user interface 40. In addition, the user interface 40 may be used to present other information to the system operator that may be useful during operation and/or training.

With reference now to FIG. 8, one example of a user interface 40 may comprise a split-screen interface 40'. The left-hand side of split-screen user interface 40' may comprise a snap-shot (e.g., caricature or a single video frame) of a subject (e.g., a person) passing through the portal 20. The right-hand side of split-screen interface 40' may comprise a plot of magnetic field gradient vs. vertical position. The plot on the right-hand side illustrates the detected magnetic field gradient sensed by the left and right side rows (e.g., 50 and 52) respectively, of the sensor array. The magnetic field plot illustrated in the right-hand side of the split-screen interface 40' is indicative of a monopole response. That is, both the left and right side sensor rows exhibit a monopole response.

In addition, because the plot of magnetic field gradient vs. vertical position is presented adjacent the snap shot of the subject passing through the portal, the system operator may also readily correlate the vertical position of the detected ferromagnetic object with the subject passing through the portal 20. In one preferred embodiment, the signal processing system 14 also calculates the approximate vertical and horizontal position of the object. The user interface 40' may then be used to place a marker (e.g., such as concentric circles "B") on the left-hand portion of the split-screen user interface 40' that correlates to the approximate position of the detected ferromagnetic object. Accordingly, the marker (e.g., concentric circles "B") further assists the system operator in specifically identifying the probable location of the detected ferromagnetic object. The split-screen user-interface 40' may also present the probabilistic determination of the classification (e.g., threat or non-threat item) of the detected ferromagnetic object. By way of example, the probabilistic determination of the classification of the detected ferromagnetic object may be presented on the split-screen user-interface 40' via a suitable text message. The probabilistic determination may also be presented aurally, e.g., via one or more tones or similar audible signals.

Another type of user interface 40 that may be presented for the user is the technical user interface 40" illustrated in FIG. 9. The technical user interface 40" presents in various forms information derived from the magnetic field data 22 produced by the magnetometers 16. For example, the first window 44 of the technical user interface 40" depicts the magnetic field data 22 in the time domain. More specifically, the data depicted in window 44 illustrates the delay between the initiation of the scan (e.g., upon receipt of the trigger event at time t=0) and the detection of the magnetic field gradient due to the detected ferromagnetic object (e.g., with a "peak" occurring at about $5\times10^{-3}$ seconds. As mentioned, this time displacement information is utilized by the 3-D target position analyzer 26 to determine whether the detected ferromagnetic object is located in front of, behind, or about mid-position, with respect to the subject. Note also the magnetic response illustrated in window 44 is indicative of a monopole response.

Window 46 of technical user interface 40" illustrates frequency domain data (e.g., FFT data 38), more specifically power spectrum data, from the FFT processor 36. As mentioned, the power spectrum data is indicative of the frequency content of the magnetic field data 22 over the entire time that the data 22 were acquired.

Window 48 of technical user interface 40" is a plot of the magnetic field data in the joint time-frequency domain (e.g., the JTFA data 34) from the JTFA processor 32. The vertical axis of window 48 is frequency, whereas the horizontal axis of window 48 is time. Thus, the JTFA data 34 presented in window 48 are indicative of the variation of frequency with time. This information can be used to calculate the instantaneous power spectrum as well as the specific frequencies of the major peak. The technical user interface 40" may be useful in "training" the system 10 as well as for monitoring the performance of the system 10 over time. Of course, the technical user interface 40" may be useful for other purposes as well.

It is contemplated that the inventive concepts herein described may be variously otherwise embodied and it is intended that the appended claims be construed to include alternative embodiments of the invention except insofar as limited by the prior art.

What is claimed is:

1. Apparatus for classifying a ferromagnetic object within a sensing area, comprising:

a magnetic field sensor, said magnetic field sensor producing magnetic field data;

a signal processing system operatively associated with said magnetic field sensor, said signal processing system comprising:

a three-dimensional target position analyzer, said three-dimensional target position analyzer being responsive to said magnetic field data produced by said magnetic field sensor, said three-dimensional target position analyzer producing an output signal indicative of a location of the ferromagnetic object with respect to a host;

a neural network responsive to said magnetic field data produced by said magnetic field sensor, said neural network comparing said magnetic field data with magnetic field data produced by known ferromagnetic objects to make a probabilistic determination as to the classification of the ferromagnetic object within the sensing area, said neural network also being operatively connected to said three-dimensional target position analyzer so that said neural network receives the output signal from said three-dimensional target position analyzer, and wherein said neural network uses the output signal from said three-dimensional target position analyzer in making the probabilistic determination of the classification of the ferromagnetic object within the sensing area; and a user interface operatively associated with said signal processing system, said user interface producing a user-discernable output indicative of the probabilistic determination of the classification of the ferromagnetic object within a sensing area, said user interface also being responsive to the output signal from said three-dimensional target position analyzer to produce a user-discernable output indicative of the location of the ferromagnetic object with respect to the host.

2. The apparatus of claim 1, wherein said signal processing system further comprises a joint time-frequency processor, said joint time-frequency processor processing the magnetic field data produced by said magnetic sensor in the joint time-frequency domain to produce JTFA data, said user interface being responsive to said JTFA data to produce a user-discernable output indicative of said magnetic field data in the joint time-frequency domain.

3. The apparatus of claim 2, wherein said neural network is operatively connected to said joint time-frequency processor so that said neural network receives the JTFA data from said joint time-frequency processor, and wherein said neural network uses the JTFA data from said joint time-frequency processor in making the probabilistic determination of the classification of the ferromagnetic object within the sensing area.

4. The apparatus of claim 1, wherein said signal processing system further comprises a fast Fourier transform processor, said fast Fourier transform processor processing the magnetic field data produced by said magnetic sensor in the frequency domain to produce FFT data, said user interface being responsive to said FTT data to produce a user-discernable output indicative of said magnetic field data in the frequency domain.

5. The apparatus of claim 4, wherein said neural network is operatively connected to said fast Fourier transform processor so that said neural network receives the FFT data from said fast Fourier transform processor, and wherein said neural network uses the FFT data from said fast Fourier transform processor in making the probabilistic determination of the classification of the ferromagnetic object within the sensing area.

6. The apparatus of claim 1, wherein said signal processing system further comprises a filter network operatively connected to said magnetic field sensor, said filter network filtering the magnetic field data produced by said magnetic field sensor before said magnetic field data are further processed by said signal processing system.

7. The apparatus of claim 6, wherein said filter network comprises an inverse Chebyshev filter.

8. The apparatus of claim 1, wherein said signal processing system further comprises a threshold analysis processor operatively connected to said magnetic field sensor, said threshold analysis processor preventing from being further processed magnetic field data below a predetermined threshold.

9. The apparatus of claim 1, wherein said magnetic field sensor comprises a plurality of magnetometers.

10. A method for classifying a ferromagnetic object within a sensing area, comprising:

sensing, during a sample time, a magnetic field in the sensing area;

producing magnetic field data representative of the sensed magnetic field during the sample time;

using a neural network to compare said magnetic field data with magnetic field data produced by known ferromagnetic objects to make a probabilistic determination as to the classification of the ferromagnetic object within a sensing area, said using a neural network comprising:

identifying at least one characteristic of the magnetic field data;

assigning a weight value to the at least one characteristic of the magnetic field data to produce weighted characteristic magnetic field data; and comparing the weighted characteristic magnetic field data with a database containing magnetic characteristics of known ferromagnetic objects; and producing a user-discernable output indicative of the probabilistic determination of the classification of the ferromagnetic object within the sensing area.

11. The method of claim 10, wherein identifying at least one characteristic comprises determining whether the magnetic field data are indicative of a monopole response.

12. The method of claim 10, wherein identifying at least one characteristic comprises determining whether the magnetic field data are indicative of a dipole response.

13. The method of claim 10, wherein identifying at least one characteristic comprises determining whether the magnetic field data are indicative of a quadrupole response.

14. The method of claim 10, further comprising:

performing joint time frequency analysis on the magnetic field data to produce JTFA data; and using the neural network to process the JTFA data and make the probabilistic determination of the classification of the ferromagnetic object within the sensing area.

15. The method of claim 10, further comprising:
determining an elapsed time between an initial trigger and a magnetic response to produce time-position data; and
using the neural network to process the time-position data and make the probabilistic determination of the classification of the ferromagnetic object within the sensing area.

16. The method of claim 10, further comprising:
performing a Fourier transform on the magnetic field data to produce FFT data; and
using the neural network to process the FFT data and make the probabilistic determination of the classification of the ferromagnetic object within the sensing area.

17. The method of claim 10, further comprising filtering the magnetic field data before using the neural network.

18. The method of claim 17, wherein filtering comprises filtering the magnetic field data with an inverse Chebyshev filter.

19. Apparatus for classifying a ferromagnetic object within a sensing area, comprising:
magnetic field sensing means for sensing a magnetic field and for producing magnetic field data;
signal processing means operatively associated with said magnetic field sensing means, said signal processing means comprising:
three-dimensional target position analyzer means for producing an output signal indicative of a location of the ferromagnetic object with respect a host;
neural network means for comparing said magnetic field data with magnetic field data of known ferromagnetic objects to make a probabilistic determination as to the classification of the ferromagnetic object within the sensing area, and for using the output signal from said three-dimensional target position analyzer means in making the probabilistic determination of the classification of the ferromagnetic object within the sensing area; and
user interface means operatively associated with said signal processing means for producing a user-discernable output indicative of the probabilistic determination of the classification of the ferromagnetic object within a sensing area.

* * * * *